(12) United States Patent
Mickelson

(10) Patent No.: US 10,173,270 B2
(45) Date of Patent: Jan. 8, 2019

(54) COUNTERSINKING DEVICE AND ASSOCIATED METHOD

(71) Applicant: The Boeing Company, Huntington Beach, CA (US)

(72) Inventor: Derek Mickelson, Everett, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 15/010,577

(22) Filed: Jan. 29, 2016

(65) Prior Publication Data
US 2017/0216934 A1   Aug. 3, 2017

(51) Int. Cl.
| | | |
|---|---|---|
| *B23B 51/10* | (2006.01) | |
| *B23B 49/00* | (2006.01) | |
| *B23B 45/04* | (2006.01) | |
| *B23Q 11/00* | (2006.01) | |

(52) U.S. Cl.
CPC ............ *B23B 49/008* (2013.01); *B23B 45/04* (2013.01); *B23B 51/104* (2013.01); *B23B 51/107* (2013.01); *B23Q 11/0046* (2013.01); *B23B 2260/0482* (2013.01); *B23B 2260/128* (2013.01); *B23B 2270/32* (2013.01); *B23B 2270/34* (2013.01)

(58) Field of Classification Search
CPC .............. B23B 51/104; B23B 51/107; B23B 2260/128; B23B 2270/32; B23B 2270/34; B23B 45/04; B23B 49/008; B23B 2260/0482; B23Q 11/0046; B23Q 5/32
See application file for complete search history.

(56) References Cited

U.S. PATENT DOCUMENTS

| | | | |
|---|---|---|---|
| 2,665,597 A | 1/1954 | Hill | |
| 2,669,887 A | 2/1954 | Rees | |
| 2,706,917 A | 4/1955 | Hill | |
| 4,688,970 A * | 8/1987 | Eckman | ............ G05B 19/4163 |
| | | | 408/10 |
| 5,775,853 A | 7/1998 | Keefer et al. | |
| 5,997,222 A | 12/1999 | Rissler | |

(Continued)

OTHER PUBLICATIONS

European Search Report dated May 29, 2017 for Application No. 16197512.3.

*Primary Examiner* — Sunil K Singh
*Assistant Examiner* — Paul M Janeski
(74) *Attorney, Agent, or Firm* — Womble Bond Dickinson (US) LLP

(57) ABSTRACT

A countersinking device includes an internal bore positioner adapted for receipt by a bore defined by a workpiece. A driver rod engaged with the internal bore positioner extends outwardly of the bore through a bore opening. A centering chuck, engaged about and axially movable along the driver rod, is configured to engage the bore opening to cooperate with the internal bore positioner to align the driver rod along a longitudinal axis of the bore. A counterbore is engaged about the driver rod, opposite the centering chuck from the internal bore positioner. The counterbore is rotatable about and is configured to be axially advanced along the driver rod to engage the bore opening and countersink the bore. A countersink depth control arrangement is associated with the counterbore and cooperates therewith to countersink the bore to a predetermined depth. An associated method is also provided.

16 Claims, 8 Drawing Sheets

(56) References Cited

U.S. PATENT DOCUMENTS

| | | | |
|---|---|---|---|
| 6,012,877 A * | 1/2000 | McCowin | B23B 49/02 |
| | | | 279/2.04 |
| 6,036,409 A * | 3/2000 | Rissler | B23B 51/107 |
| | | | 408/111 |
| 7,755,761 B2 | 7/2010 | Mathis et al. | |
| 8,006,362 B2 | 8/2011 | Sarh | |
| 8,096,038 B2 | 1/2012 | Condliff | |
| 8,167,518 B2 | 5/2012 | Mathis et al. | |
| 8,171,642 B2 | 5/2012 | Fritsche et al. | |
| 8,454,280 B2 | 6/2013 | Dods et al. | |
| 8,454,281 B2 | 6/2013 | Katzenberger et al. | |
| 8,464,434 B1 | 6/2013 | Kostenia et al. | |
| 8,479,382 B2 | 7/2013 | Sarh | |
| 8,668,410 B1 | 3/2014 | Arana et al. | |
| 8,696,267 B2 | 4/2014 | Khurana | |
| 8,925,184 B2 | 1/2015 | Condliff | |
| 9,162,332 B2 | 10/2015 | Wright et al. | |
| 9,199,715 B2 | 12/2015 | Koncz | |
| 9,205,933 B2 | 12/2015 | Oberoi et al. | |
| 9,259,779 B2 | 2/2016 | Sarh et al. | |

\* cited by examiner

COUNTERSINKING DEVICE AND ASSOCIATED METHOD

BACKGROUND

Field of the Disclosure

The present disclosure is directed to a portable countersinking device for forming a countersunk bore in a workpiece.

Description of Related Art

Large diameter holes for certain fasteners, such as sleeve bolts, can typically only be drilled in a workpiece by large automated equipment. These relatively large holes may also often require a countersink at the entrance of the hole. Due to, for example, tight required tolerances and awkward ergonomics of such a countersinking operation, the countersink may not be able to be effectively and consistently performed by an operator in a manual process, and generally requires some sort of portable, power-fed and guided (i.e. automated) tool to meet process requirements. Generally, conventional automated tools for performing a countersink operation are targeted at and configured for small diameters holes, and may not necessarily be applicable or scalable to countersink relatively large diameter holes in a workpiece. Since such large diameter holes are often formed in a similarly large workpiece, the associated countersink operation would preferably be accomplished with a portable tool having sufficient power to handle up to the largest diameter countersinks, and the flexibility of performing different machining processes that may be required by various different types of materials forming the workpiece (i.e., continuous control and adaptability).

As such, there exists a need for a device and method directed to a countersinking device that addresses issues such as portability and automation, which may be lacking in conventional tools and processes.

SUMMARY OF THE DISCLOSURE

The above and other needs are met by aspects of the present disclosure which, in one aspect, provides a portable countersinking device. Such a device comprises an internal bore positioner adapted to be received by a bore defined by a workpiece. A driver rod is engaged with the internal bore positioner and extends outwardly of the bore through a bore opening in a surface of the workpiece. A centering chuck is engaged about the driver rod, wherein the centering chuck is axially movable along the driver rod and is configured to engage the bore opening so as to cooperate with the internal bore positioner to align the driver rod along a longitudinal axis of the bore. A counterbore is engaged about the driver rod, opposite the centering chuck from the internal bore positioner. The counterbore is rotatable about the driver rod and is configured to be axially advanced along the driver rod to engage the bore opening and to countersink the bore. A countersink depth control arrangement is associated with the counterbore and is configured to cooperate therewith to countersink the bore to a predetermined depth.

Another aspect of the present disclosure provides a method of forming a portable countersinking device. Such a method comprises engaging a driver rod with an internal bore positioner adapted to be received by a bore defined by a workpiece, wherein the driver rod is configured to extend from the internal bore positioner and outwardly of the bore through a bore opening in a surface of the workpiece. A centering chuck is engaged about the driver rod, wherein the centering chuck is axially movable along the driver rod and is configured to engage the bore opening so as to cooperate with the internal bore positioner to align the driver rod along a longitudinal axis of the bore. A counterbore is engaged about the driver rod, opposite the centering chuck from the internal bore positioner, wherein the counterbore is rotatable about the driver rod and is configured to be axially advanced along the driver rod to engage the bore opening and to countersink the bore. A countersink depth control arrangement is associated with the counterbore, wherein the countersink depth control element is configured to cooperate with the counterbore to countersink the bore to a predetermined depth.

The aspects, functions and advantages discussed herein may be achieved independently in various example implementations/aspects or may be combined in yet other example implementations/aspects, further details of which may be seen with reference to the following description and drawings.

BRIEF DESCRIPTION OF THE DRAWINGS

Figure 1:
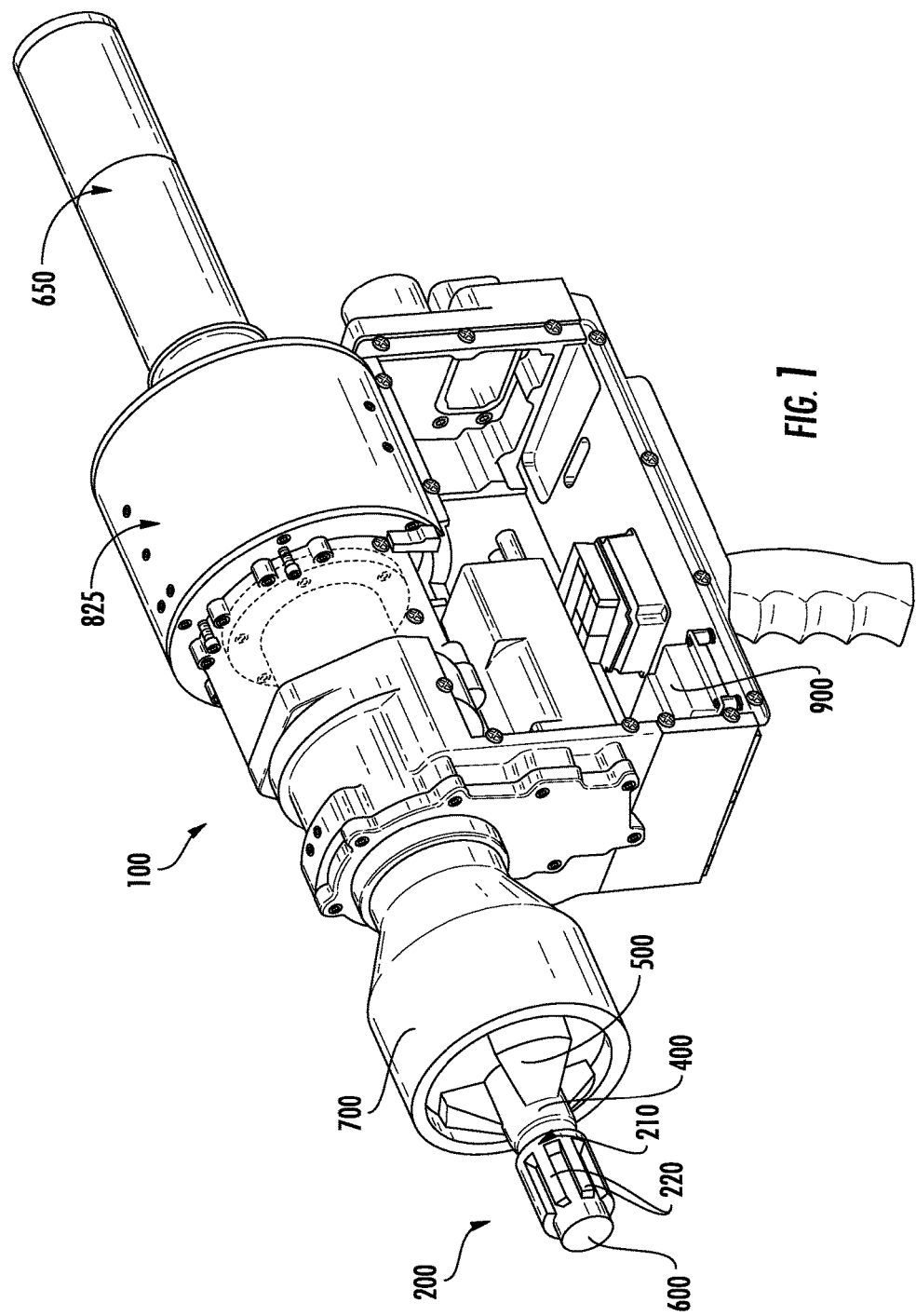
Figure 2:
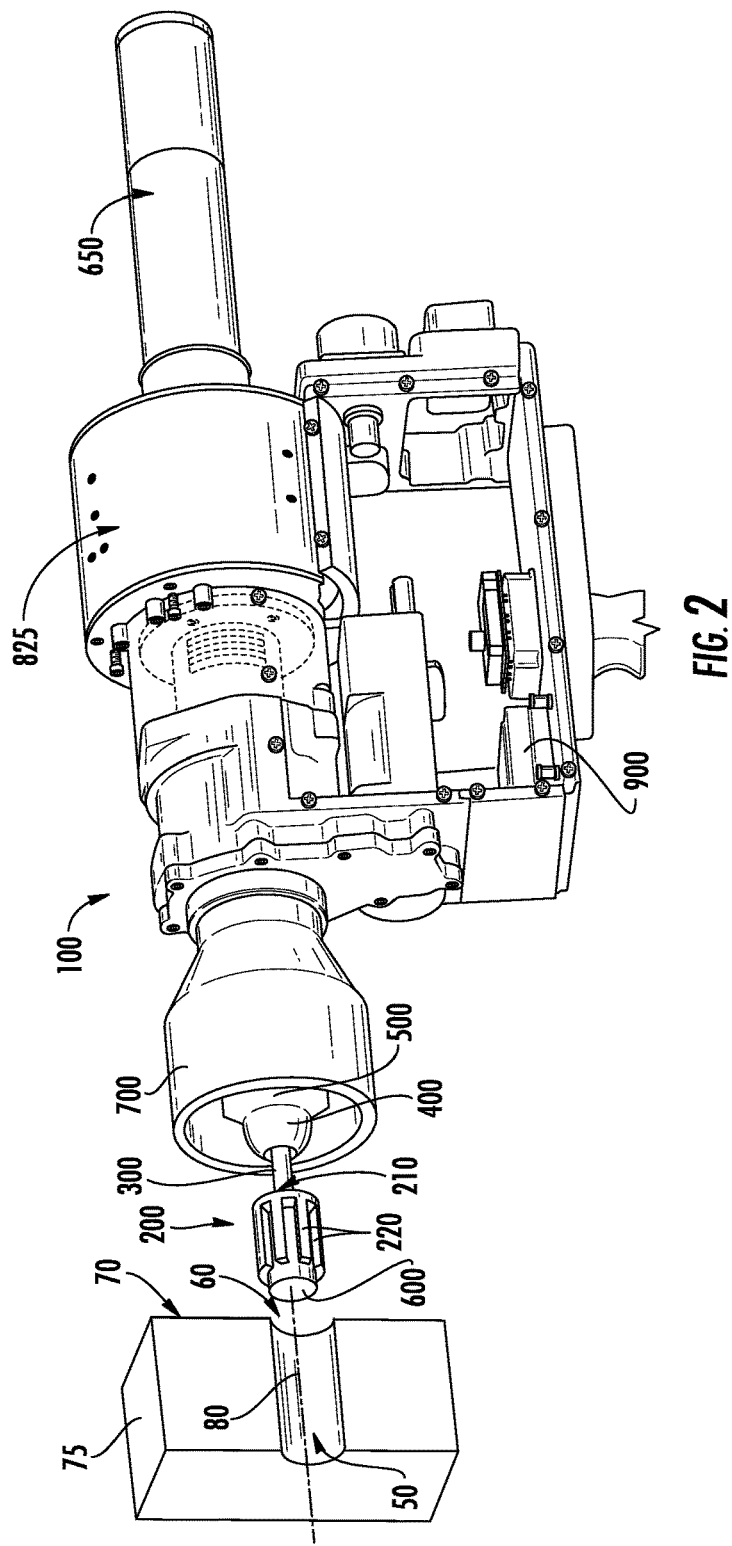
Figure 3:
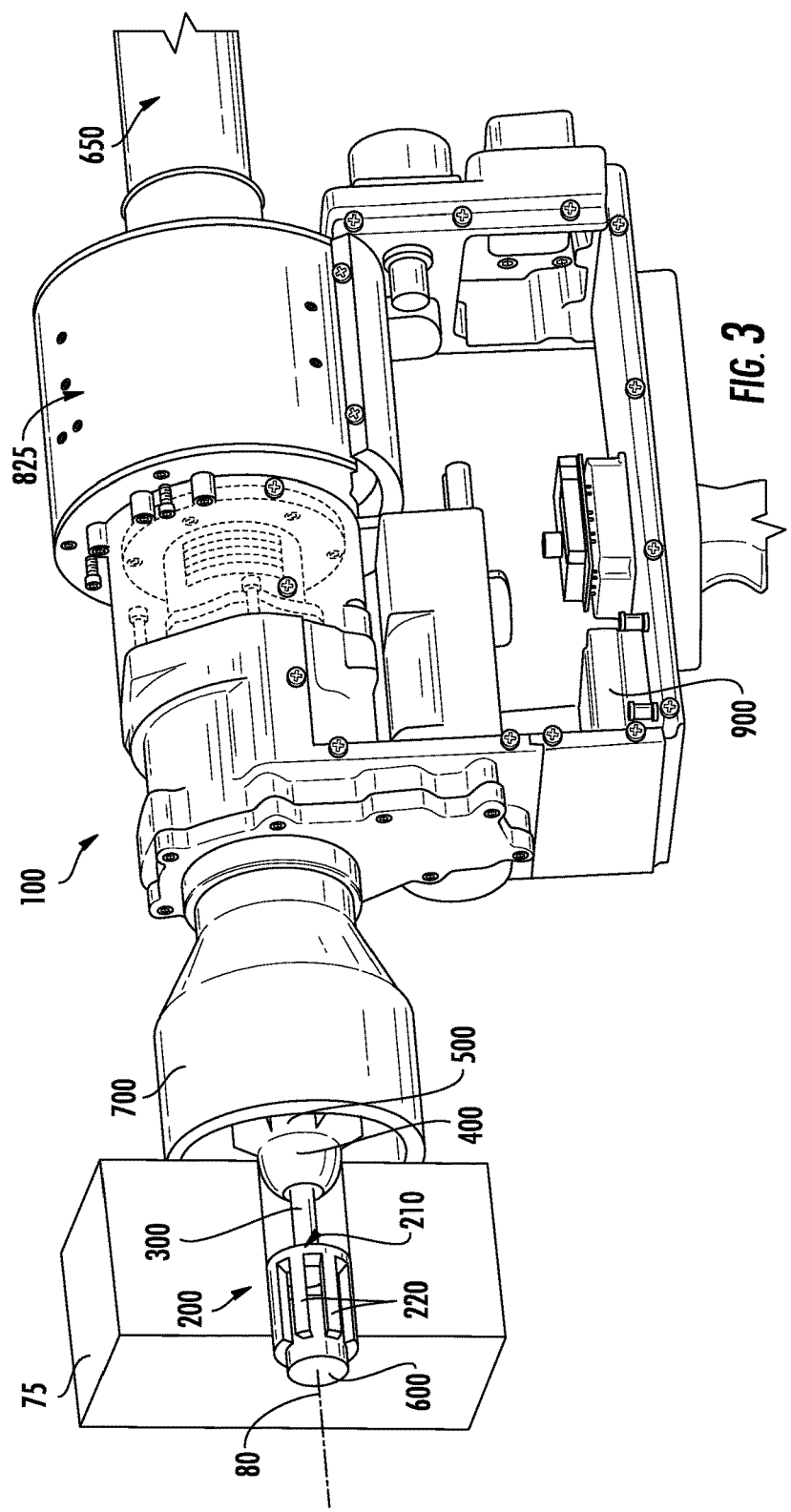
Figure 4:
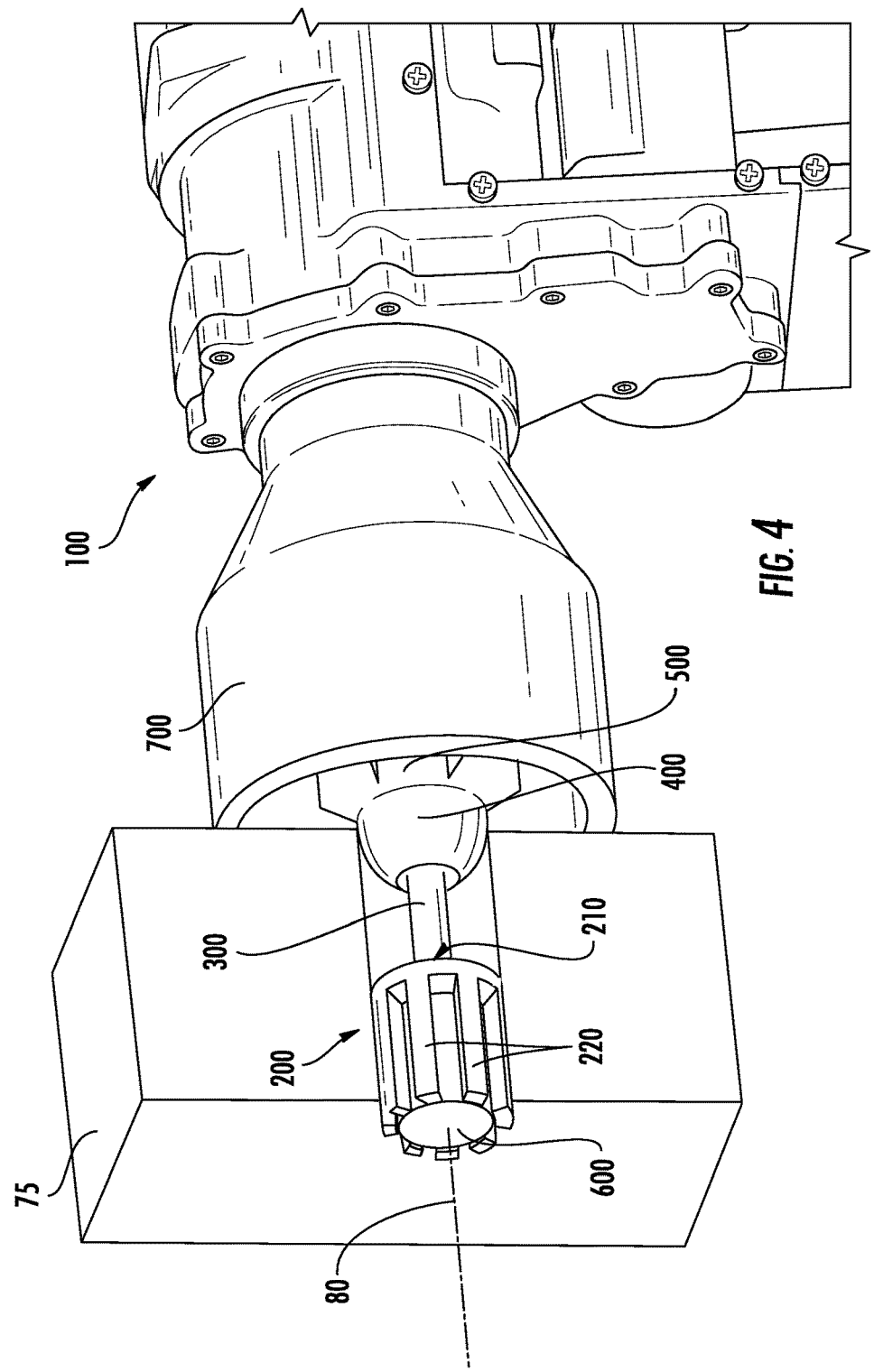
Figure 5:
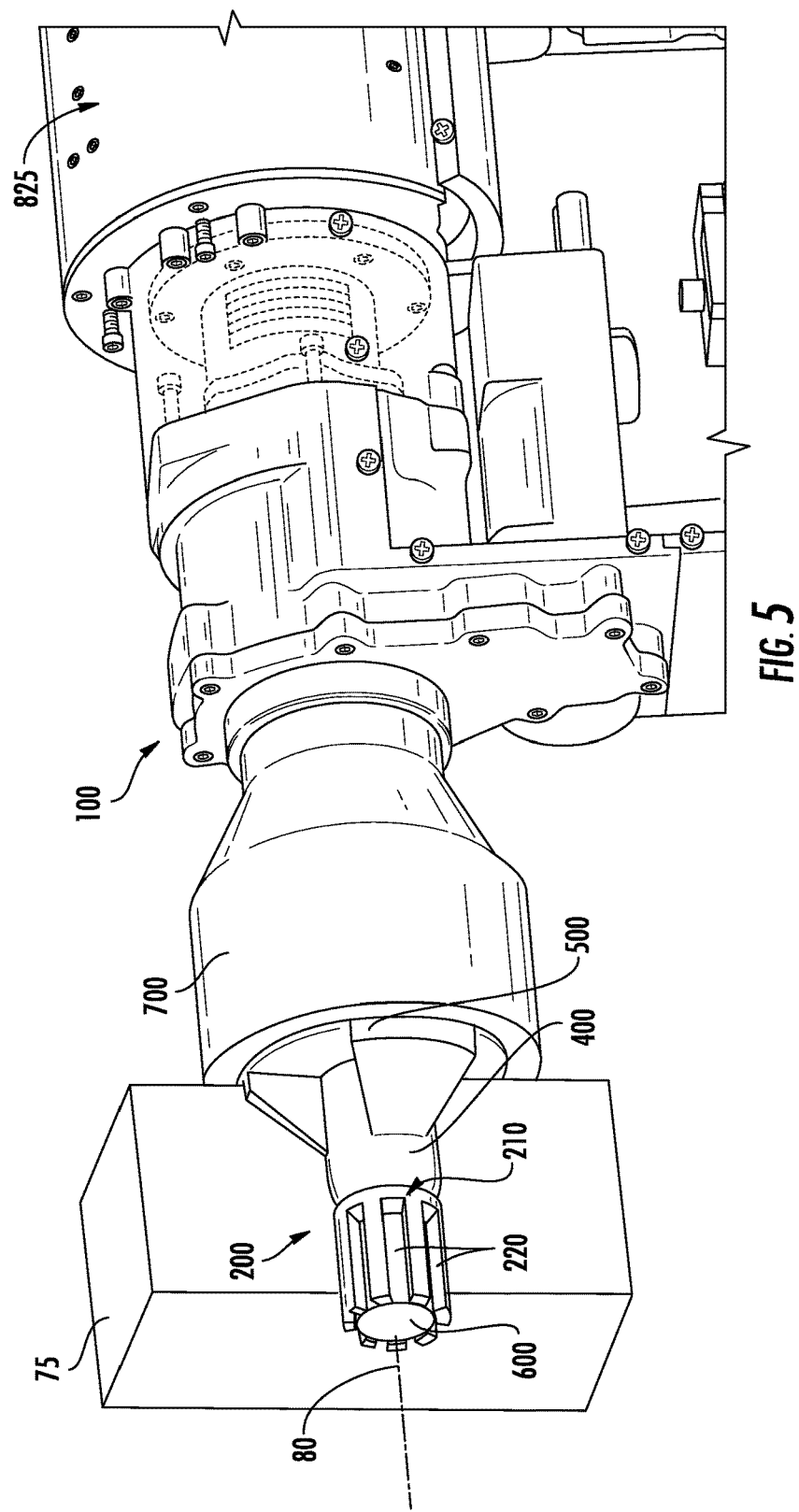
Figure 6:
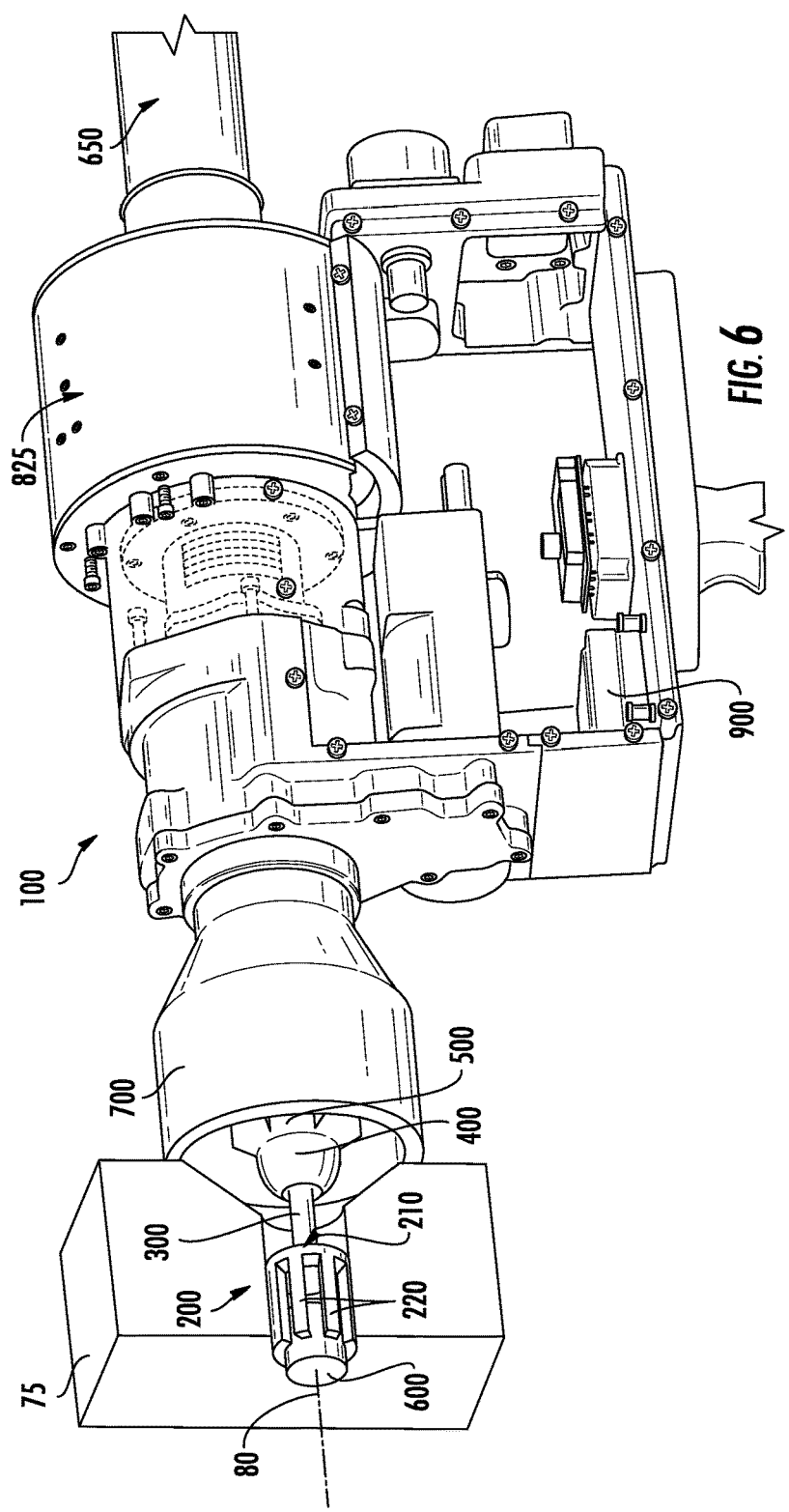
Figure 7:
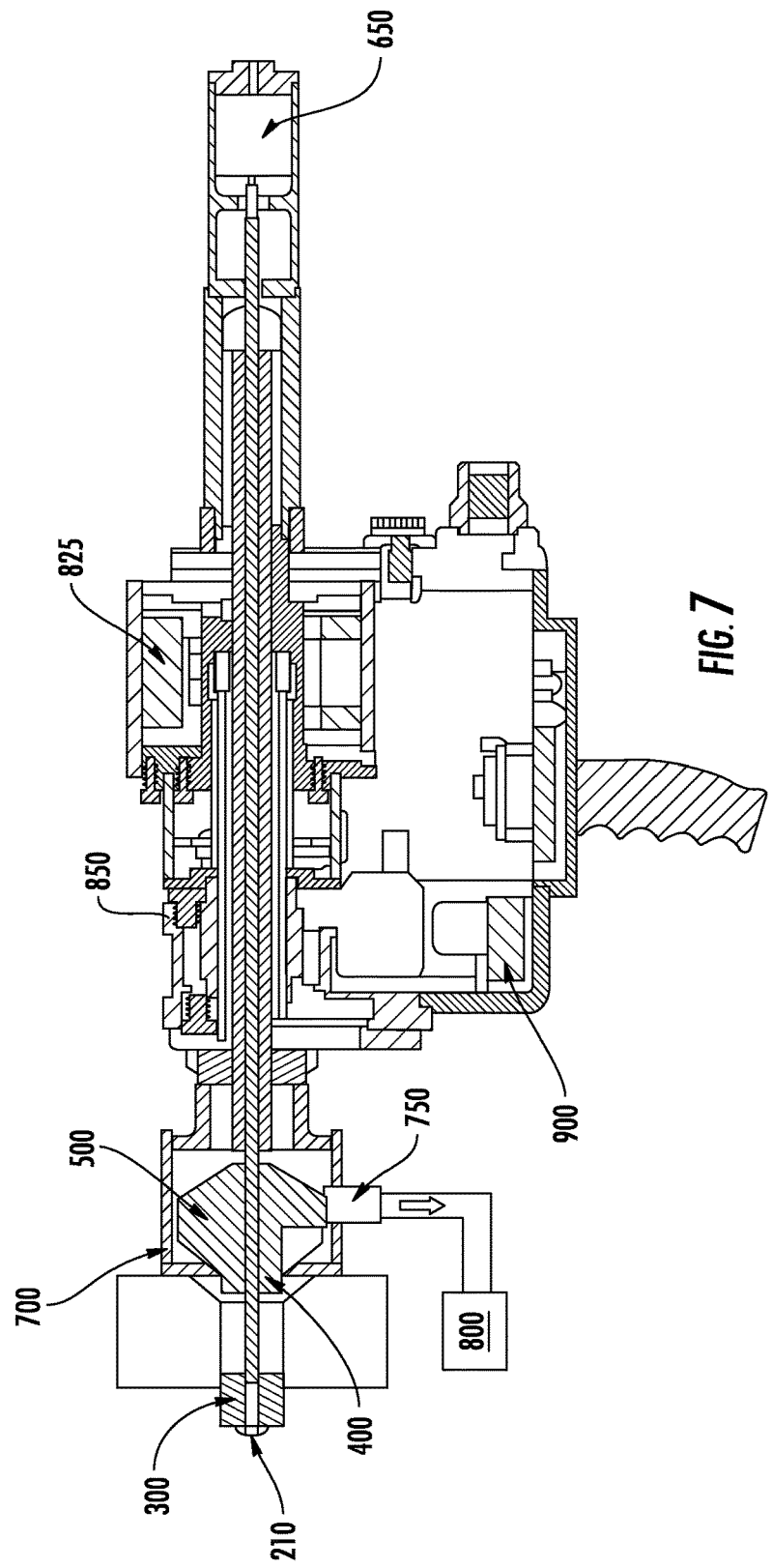
Figure 8:
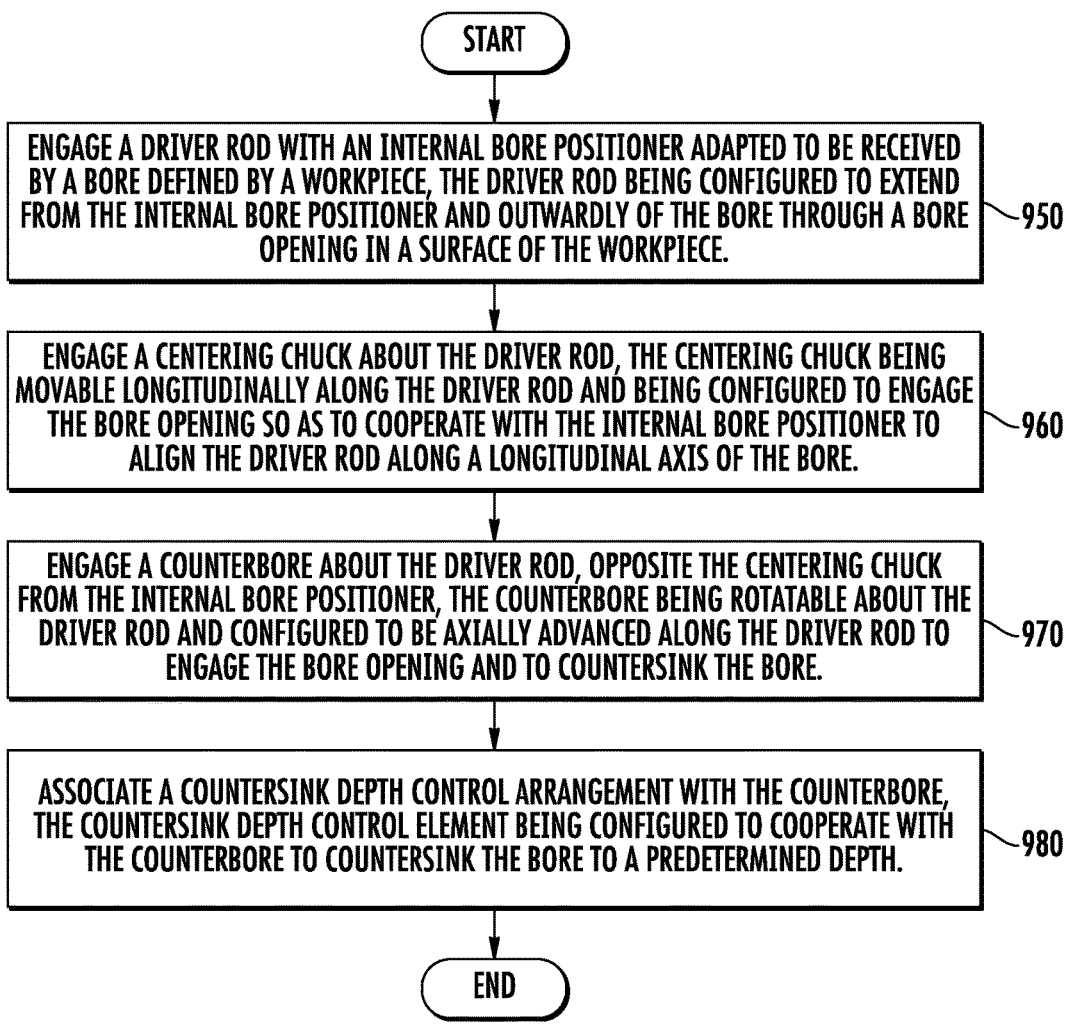

Having thus described the disclosure in general terms, reference will now be made to the accompanying drawings, which are not necessarily drawn to scale, and wherein:

FIG. 1 schematically illustrates a countersinking device, according to one aspect of the present disclosure;

FIG. 2 schematically illustrates a countersinking device, according to one aspect of the present disclosure, in proximity to a workpiece;

FIG. 3 schematically illustrates a countersinking device, according to one aspect of the present disclosure, having first and centering chucks thereof engaged with a bore defined by the workpiece;

FIG. 4 schematically illustrates a countersinking device, according to one aspect of the present disclosure, having the internal bore positioner actuated within the bore to secure the countersinking device to the workpiece;

FIG. 5 schematically illustrates a countersinking device, according to one aspect of the present disclosure, having a rotating counterbore being axially advanced into the bore defined by the workpiece to countersink the bore;

FIG. 6 schematically illustrates a countersinking device, according to one aspect of the present disclosure, having the counterbore axially retracted from the bore defined by the workpiece and the internal bore positioner deactuated within the bore;

FIG. 7 schematically illustrates a longitudinal cross-sectional view of a countersinking device, according to one aspect of the present disclosure; and FIG. 8 schematically illustrates a method of forming a portable countersinking device, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

As schematically illustrated in FIGS. 1-7, one aspect of the present disclosure provides a portable countersinking device 100, comprising an internal bore positioner 200 adapted to be received by a bore 50 defined by a workpiece 75. A driver rod 300 is engaged with the internal bore positioner 200 and is configured to extend outwardly of the bore 50 through a bore opening 60 in a surface 70 of the workpiece 75. A centering chuck 400 is engaged about the driver rod 300. In particular instances, the centering chuck 400 is configure to be movable longitudinally or axially along the driver rod 300, and to engage the bore opening 60 so as to cooperate with the internal bore positioner 200 to align the driver rod 300 along a longitudinal axis 80 of the bore 50. A counterbore 500 is engaged about the driver rod 300, generally opposite to the centering chuck 400 from the internal bore positioner 200. The counterbore 500 is configured to be rotatable about the driver rod 300 and to be axially advanced along the driver rod 300 to engage the bore opening 60 and to countersink the bore 50. A countersink depth control arrangement is associated with the counterbore 500 and is configured to cooperate therewith to countersink the bore 50 to a predetermined depth.

In some aspects, the internal bore positioner 200 comprises a collet 210 configured to be actuatable between a radially-contracted arrangement (see, e.g., FIGS. 1-3 and 6), for allowing the collet 210 to be inserted into and removed from the bore 50, and a radially-expanded arrangement (see, e.g., FIGS. 4 and 5), for securing the collet 210 at a selected depth within the bore 50. In some instances, the collet 210 is pneumatically actuatable between the radially-contracted arrangement and the radially-expanded arrangement via the driver rod 300. More particularly, in some instances, the collet 210 may have a generally (hollow) cylindrical configuration, including a plurality of longitudinally-extending and angularly-arranged gripping members 220 collectively defining the hollow cylinder. In addition, the driver rod 300 may be configured to have a mandrel 600 coaxially engaged therewith. For example, the mandrel 600 may be received by and within the driver rod 300 and configured to be axially movable with respect thereto. More particularly, the mandrel 600 may be axially movable with respect to the driver rod 300, between an axially-contracted position (see, e.g., FIGS. 4 and 5) and an axially-extended position (see, e.g., FIGS. 1-3 and 6) with respect to the driver rod 300. The mandrel 600 may be axially movable, for instance, in response to a pneumatic actuator 650 (i.e., an air cylinder/solenoid) engaged with the driver rod 300, with the air pressure imparted thereby being operable on the mandrel 600 through the driver rod 300. In such instances, the mandrel 600 may be received by the collet 210 (i.e., within the gripping members 220 defining the hollow cylinder) such that, in the axially-extended position of the mandrel 600 with respect to the driver rod 300, the collet 210 is in the radially-contracted arrangement and, in the axially-contracted position of the mandrel 600 with respect to the driver rod 300, the collet 210 is in the radially-expanded arrangement.

In some aspects, the countersinking device 100 may further comprise a shroud 700 (i.e., a nosepiece) extending about the driver rod 300 and the counterbore 500. In addition, as shown, for example, in FIG. 7, a vacuum source 800 may be operably engaged with the shroud 700 via a vacuum port 750 defined by the shroud 700, wherein the vacuum source 800 is configured to cooperate with the vacuum port 750 to evacuate portions of the workpiece 75 removed by the counterbore 500 from the shroud 700. That is, a suction or vacuum provided by the vacuum source 800 is directed to interact with the shroud 700 via the vacuum port 750 to remove shavings, chips, etc. of the workpiece 75 removed by the counterbore 500 countersinking the bore 50. In particular aspects, the shroud 700 may be axially fixed with respect to the driver rod 300.

As disclosed, the collet 210 may be configured to cooperate with the mandrel 600 and the driver rod 300 such that the collet 210 in the radially-contracted arrangement (i.e., with the mandrel 600 in the axially-extended position with respect to the driver rod 300) is insertable into the bore 50 defined by the workpiece. In some instances, the collet 210 may be inserted into the bore 50 until the shroud 700 engages the surface 70 of the workpiece 75. Further, the centering chuck 400, disposed between the internal bore positioner 200 and the counterbore 500, and when engaged with the counterbore 500 disposed within the shroud 700, may extend axially toward the internal bore positioner 200 to a greater extent than the shroud 700. That is, the centering chuck 400, when normally engaged with the counterbore 500, extends outwardly of the shroud 700 toward the collet 210. In some instances, the centering chuck 400 is engaged with and serially disposed with respect to the counterbore 500, and is rotatable therewith about the driver rod 300, to thereby be configured as a countersink pilot. As such, when the collet 210 is inserted into the bore 50 until the shroud 700 engages the surface 70 of the workpiece 75, the centering chuck 400 proceeds the shroud 700 to engage the bore 50 (see, e.g., FIGS. 3 and 4). The first and centering chucks 200, 400 may thus cooperate to align the driver rod 300 along a longitudinal axis 80 of the bore 50.

Accordingly, upon actuation of the pneumatic actuator 650, the collet 210, which is inserted into the bore 50 such that the shroud 700 engages the surface 70 of the workpiece 75, and such that the centering chuck 400 (i.e., countersink pilot) engages the bore 50, radially expands to the radially-expanded arrangement in response to the mandrel 600 being moved toward the axially-contracted position. The collet 210 being expanded into the radially-expanded arrangement thus causes the angularly-arranged gripping members 220 collectively defining the hollow cylinder to expand radially outward to engage or grip the wall of the bore 50. In particular instances, the second positioning member 400 may be sized to the dimension (i.e., diameter) of the bore 50, or may be a tapered or radially expanding member. Accordingly, both the first and centering chucks 200, 400 are configured to align the driver rod 300 along a longitudinal axis 80 of the bore 50, prior to the initiation of the countersink process via the countersink member 500. In addition, the throw (i.e., the range of axial movement) of the mandrel 600 with respect to the driver rod 300, may further draw or advance the shroud 700 toward the collet 210 (i.e., in response to axial movement of the mandrel 300 to the axially-contracted position to actuate the collet 210 to the radially-expanded position) such that the shroud 700 is securely engaged with and held against the surface 70 of the workpiece 75. In this manner, for example, the shroud 700 may serve to support the surface 70 of the workpiece 75 about the bore 50 so as to lessen the risk of deformation of the surface 70 about the bore during the countersinking process. The secure arrangement with the workpiece 75, realized through cooperation between the internal bore positioner 200, the driver rod 300, the centering chuck 400, and the shroud 700, may thus provide improved positioning and guiding of the counterbore 500 to countersink the bore 50.

A drive element 825 may further be operably engaged with the counterbore 500, wherein the drive element 825 is configured to rotate the counterbore 500 (i.e., using a servo-driven spindle for accurate control of spindle rotational speed, with stall warning and load monitoring capabilities) about the driver rod 300 (i.e., the elongate remember 300 remains stationary and does not rotate about the longitudinal axis 80) and to axially advance the counterbore 500 (i.e., using a servo axial feed device for precise feed rate and axial position control) along the driver rod 300 (at least partially guided by the centering chuck 400), such that the counterbore 500 engages and countersinks the bore 50 about the surface 70 of the workpiece 75 to a preselected depth. In some aspects, a drive element controller 900 may be arranged in communication with the drive element 825. In particular instances, the drive element 825 may be further configured to rotate and axially advance the counterbore 500 with respect to the workpiece 75, in response to rotational speed and feed rate parameters, for example, associated with the workpiece 75, wherein such parameters are communicated to the drive element 825 by the drive element controller 900. That is, for a particular workpiece 75 comprised of a particular material, the drive element controller 900 may be programmed to rotate the counterbore 500 at a certain rotational speed (i.e., rpm) and to advance the counterbore 500 into the workpiece 75 at a certain rate (i.e., feed rate). One skilled in the art will appreciate, however, that the rotational speed and feed rate may vary depending on many different factors and thus are not necessarily required to be constant, but could alternately be variable (i.e., the rotational speed or feed rate could vary depending on the depth of the counterbore 500 within the workpiece 75).

The depth of the countersink in the workpiece 75 may be determined in different manners. For example, the countersink depth control arrangement may comprise a sensor 850 (see, e.g., FIG. 7) configured to determine that the centering chuck 400 has advanced into the bore 50, in association with the counterbore 500, to engage the internal bore positioner 200. The engagement between the first and centering chucks 200, 400 may be sensed by the sensor 850 as, for example, an increased axial load or a decreased rotational load on the drive element 825. In other instances, the sensor 850 may be configured to determine the axial extent to which the counterbore 500 has been advanced (without necessarily determining any engagement between the first and centering chucks 200, 400). In any instance, once the predetermined or preselected depth of the countersink is attained by the counterbore 500, the sensor 850 may be configured to direct the drive element 825 to axially retract the counterbore 500 along the driver rod 300, for example, to within the shroud 700.

Once the countersink process is completed and the counterbore 500 retracted, the collet 210 can be returned to the radially-contracted arrangement by actuating the mandrel 600 to the axially-extended position with respect to the driver rod 300, wherein the entire countersinking device can then be removed from the countersunk bore 50 (see, e.g., FIG. 6).

FIG. 8 schematically illustrates a method of forming a portable countersinking device. Such a method may comprise engaging a driver rod with an internal bore positioner, adapted to be received by a bore defined by a workpiece, wherein the driver rod is configured to extend from the internal bore positioner and outwardly of the bore through a bore opening in a surface of the workpiece (Block 950). A centering chuck is engaged about the driver rod, wherein the centering chuck is axially movable along the driver rod and is configured to engage the bore opening so as to cooperate with the internal bore positioner to align the driver rod along a longitudinal axis of the bore (Block 960). A counterbore is engaged about the driver rod, opposite the centering chuck from the internal bore positioner, wherein the counterbore is rotatable about the driver rod and is configured to be axially advanced along the driver rod to engage the bore opening and to countersink the bore (Block 970). A countersink depth control arrangement is associated with the counterbore, the countersink depth control element being configured to cooperate with the counterbore to countersink the bore to a predetermined depth (Block 980). Other aspects and/or steps of such a method of forming a portable countersinking device are otherwise disclosed in connection with the disclosure of the various embodiments and aspects of a portable countersinking device otherwise addressed herein.

Aspects of the present disclosure thus provide a portable countersinking device and associated method which may allow the realization of improved ergonomics for an operator in a countersinking process requiring portable and automated tools. Such aspects also remove the need for manual feeding or rotation of the counterbore by the operator. The portability of the disclosed device, combined with the automation of the process, allows increased and improved control of the countersinking process which, in turn, provides improved process quality and consistency at increased cycle speeds. Accordingly, less rework is required. Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A portable countersinking device, comprising:
   a driver rod having a proximal portion and a longitudinally-opposed distal portion, the distal portion being adapted to be received by a bore defined by a workpiece with the driver rod extending therefrom outwardly from the bore through a bore opening in a surface of the workpiece;
   an internal bore positioner comprising:
      a collet including a base engaged with the distal portion of the driver rod and a plurality of gripping members extending longitudinally from the base away from the proximal portion of the driver rod, the gripping members being angularly spaced apart about a periphery of the base and being configured to be actuatable between a contracted arrangement, for allowing the collet to be inserted into and removed from the bore, and an expanded arrangement; and
      a mandrel disposed about the distal portion and coaxially engaged with the driver rod and configured to be actuatable and axially movable between a contracted position and an extended position with respect to the distal end, the mandrel actuated to move toward the proximal portion of the driver rod to the contracted position being received between the plurality of gripping members and urging the gripping members radially outward into the expanded arrangement in engagement with the bore so as to secure the collet at a selected depth therein, and the mandrel actuated to move away from the proximal portion of the driver rod to the extended position allowing the plurality of gripping members to return to the contracted arrangement;

a centering chuck engaged about the driver rod, the centering chuck being axially movable along the driver rod and being configured to engage the bore opening so as to cooperate with the internal bore positioner to align the driver rod along a longitudinal axis of the bore;

a counterbore engaged about the driver rod, opposite the centering chuck from the internal bore positioner, the counterbore being rotatable about the driver rod and configured to be axially advanced along the driver rod to engage the bore opening and to countersink the bore; and a countersink depth control arrangement associated with the counterbore and configured to cooperate therewith to countersink the bore to a predetermined depth.

2. The device of claim 1, wherein the collet is pneumatically actuatable between the contracted arrangement and the expanded arrangement by an pneumatic actuator engaged therewith via the driver rod.

3. The device of claim 1, comprising a shroud extending about the driver rod and the counterbore, wherein the shroud is configured to be advanced toward the collet in response to axial movement of the mandrel to the contracted position to actuate the collet to the expanded position.

4. The device of claim 3, comprising a vacuum source operably engaged with the shroud via a vacuum port defined thereby, the vacuum source being configured to cooperate with the vacuum port to evacuate portions of the workpiece removed by the counterbore from the shroud.

5. The device of claim 1, wherein the centering chuck is engaged with and serially disposed with respect to the counterbore, and is rotatable therewith about the driver rod.

6. The device of claim 1, comprising a drive element operably engaged with the counterbore, the drive element being configured to rotate the counterbore about the driver rod and to axially advance the counterbore along the driver rod.

7. The device of claim 6, wherein the countersink depth control arrangement comprises a sensor configured to direct the drive element to axially retract the counterbore along the driver rod in response to determining that the centering chuck has advanced into the bore, in association with the counterbore, to engage the internal bore positioner.

8. The device of claim 6, comprising a drive element controller in communication with the drive element, the drive element being configured to rotate and axially advance the counterbore in response to rotational speed and feed rate parameters associated with the workpiece and communicated to the drive element by the drive element controller.

9. A method of forming a portable countersinking device, comprising:

engaging a distal end of a driver rod with a collet of an internal bore positioner adapted to be received by a bore defined by a workpiece, the driver rod being configured to extend from the internal bore positioner toward a proximal end of the driver rod and outwardly of the bore through a bore opening in a surface of the workpiece, the collet including a base engaged with the distal portion of the driver rod and a plurality of gripping members extending longitudinally from the base away from the proximal portion of the driver rod, the gripping members being angularly spaced apart about a periphery of the base and being configured to be actuatable between a contracted arrangement and an expanded arrangement;

coaxially engaging a mandrel with the distal end of the driver rod such that mandrel is configured to be actuatable and axially movable between a contracted position and an extended position with respect to the distal end, the mandrel actuated to move toward the proximal portion of the driver rod to the contracted position being received between the plurality of gripping members and urging the gripping members radially outward into the expanded arrangement in engagement with the bore so as to secure the collet at a selected depth therein, and the mandrel actuated to move away from the proximal portion of the driver rod to the extended position allowing the plurality of gripping members to return to the contracted arrangement allowing the collet to be inserted into and removed from the bore;

engaging a centering chuck about the driver rod, the centering chuck being movable longitudinally along the driver rod and being configured to engage the bore opening so as to cooperate with the internal bore positioner to align the driver rod along a longitudinal axis of the bore;

engaging a counterbore about the driver rod, opposite the centering chuck from the internal bore positioner, the counterbore being rotatable about the driver rod and configured to be axially advanced along the driver rod to engage the bore opening and to countersink the bore; and associating a countersink depth control arrangement with the counterbore, the countersink depth control element being configured to cooperate with the counterbore to countersink the bore to a predetermined depth.

10. The method of claim 9, wherein engaging a driver rod with an internal bore positioner comprises engaging the driver rod with a collet configured to be pneumatically actuatable between a contracted arrangement and an expanded arrangement by an pneumatic actuator engaged therewith via the driver rod.

11. The method of claim 9, comprising engaging a shroud with and to extend about the driver rod and the counterbore, wherein the shroud is configured to be advanced toward the collet in response to axial movement of the mandrel to the contracted position to actuate the collet to the expanded position.

12. The method of claim 11, comprising operably engaging a vacuum source with the shroud via a vacuum port defined thereby, the vacuum source being configured to cooperate with the vacuum port to evacuate portions of the workpiece removed by the counterbore from the shroud.

13. The method of claim 9, wherein engaging a centering chuck about the driver rod and engaging a counterbore about the driver rod comprise engaging the centering chuck and the counterbore, the centering chuck being engaged with and serially disposed with respect to the counterbore, about the driver rod such that the centering chuck and the counterbore are rotatable about the driver rod.

14. The method of claim 9, comprising operably engaging a drive element with the counterbore, the drive element being configured to rotate the counterbore about the driver rod and to axially advance the counterbore along the driver rod.

15. The method of claim 14, wherein associating a countersink depth control arrangement with the counterbore comprises associating a sensor with the counterbore, the sensor being configured to direct the drive element to axially retract the counterbore along the driver rod in response to determining that the centering chuck has advanced into the bore, in association with the counterbore, to engage the internal bore positioner.

16. The method of claim 14, comprising engaging a drive element controller into communication with the drive element, the drive element being configured to rotate and axially advance the counterbore in response to rotational speed and feed rate parameters associated with the workpiece and communicated to the drive element by the drive element controller.

* * * * *